Aug. 19, 1952 — L. M. GRIMES — 2,607,078
METHOD AND APPARATUS FOR MAKING THERMOPLASTIC TUBING
Filed Dec. 27, 1949 — 3 Sheets-Sheet 1

Inventor:
Louis M. Grimes
By Lee J. Gary, Attorney

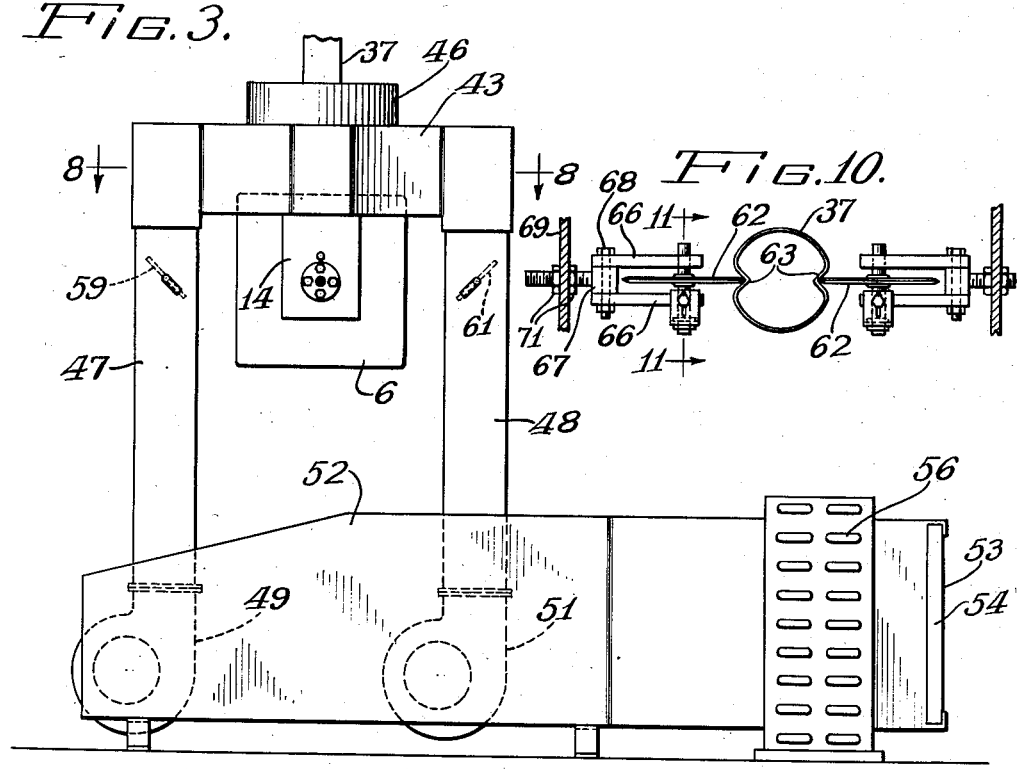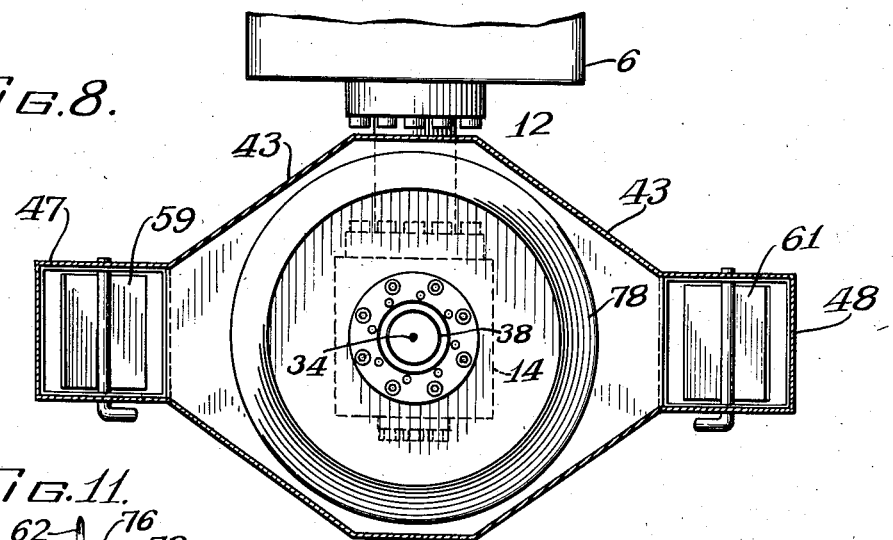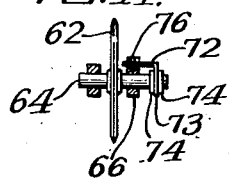

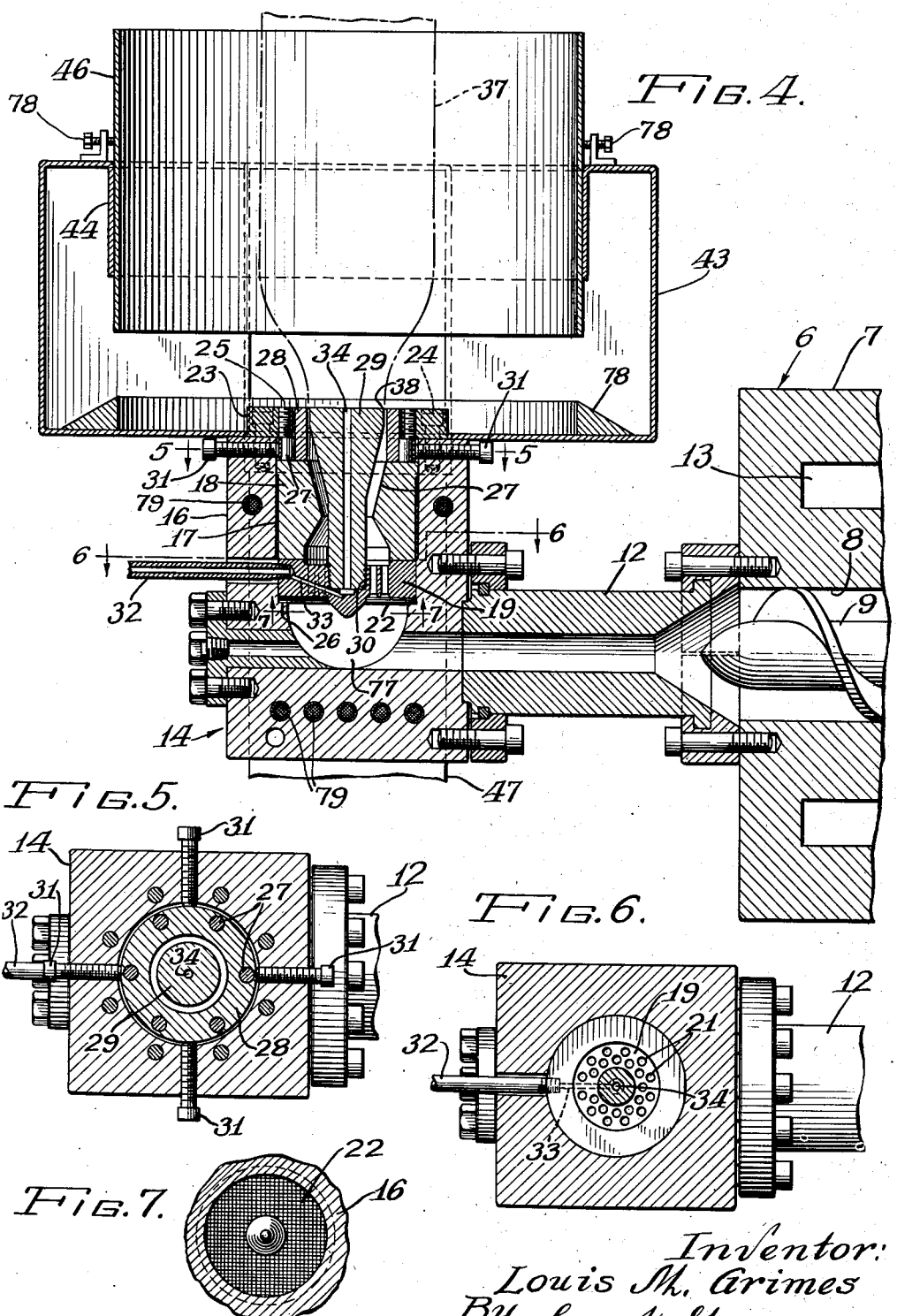

Patented Aug. 19, 1952

2,607,078

UNITED STATES PATENT OFFICE 2,607,078

METHOD AND APPARATUS FOR MAKING THERMOPLASTIC TUBING

Louis M. Grimes, Chicago, Ill.

Application December 27, 1949, Serial No. 135,089

5 Claims. (Cl. 18—14)

This invention relates to a method and apparatus for making thin-walled continuous seamless tubing from thermoplastic material rendered soft and viscous by the application of heat.

Tubular film is basically extruded the same as heavy wall plastic or rubber tubing. The I. D. of the tube is held to size with air pressure while the wall thickness is regulated by the die size and amount of internal inflation. This is not a new technique and dates back to the original rubber tube extrusion. However, I have found that by using refrigerated air for the effect of setting the molecular structure of the film at a predetermined point in the orientation of the film so that it preserves in the film a further elastic limit not possessed by a film which has been oriented or stretched to a size just within its bursting or tearing point the resultant film is superior to film made by other processes. The molecules are thus chilled and held into their more normal position instead of being displaced by stretching to a point where a tear would naturally occur.

A further improvement in my extrusion method is that I have moved the breaker plate and pressure screens to a forward position. In all normal extrusion operations, the breaker plate and pressure screens have been kept close adjacent to the end of the screw feed where the raw material is reduced to a molten mass. My method of a closed chamber away from the heated screw permits the material to relax and relieve itself of the ribbon-like form that it emerges with as the result of the pitch of the screw. From this chamber, a more homogeneous mass is forced through the circular opening of the die and the resultant film is free of longitudinal weakness evidenced by strain or actual thinness which, observed through a microscope, in an ordinary extruder operation would bear a relation to the speed of the screw and its pitch.

The pair of nip rolls, common in prior art of extrusion, arranged vertically over the die instead of horizontally has been done in the past but has the further advantage of providing thin wall tubing more accurately to dimension, as there is no natural tendency to gravitation to result in an egg-shaped tube. The concentricity is further assisted by the nip rolls which are movable in relation to the die allowing much closer adjustment and control of dimension. In connection with the nip rolls and at 90° to their point of contact, a set of two circular discs are brought into contact with the side of the tubular film in such a manner to produce a crease adjustable to any depth, usually 25% of the diameter of the tube. The discs rotate on frictionless bearings, so there is no tendency to score or rearrange the molecules in the film itself. By this method, a gusseted tube is produced wherein the strength is the equal of an ungusseted tube.

The present invention contemplates the provision of an extrusion apparatus in which thermoplastic stock in the form of strips, briquettes, powder or granules is first treated within a conventional screw-type extrusion machine having a cylinder which may be heated by either electrical heating elements or oil to maintain the cylinder at a temperature of from 350° F. to 500° F. As the stock is moved through the cylinder by the screw, it is heated to a predetermined temperature and subjected to a kneading and folding action to provide a homogeneous mass of uniform heat and consistency for extrusion through an annular die orifice to form a seamless tubing.

As the tubing passes from the annular die orifice it is in an unset or partly set condition and is permanently enlarged by inflating and stretching the tubing to a predetermined diameter and then quickly setting the molecular structure of the film by the use of refrigerated air. The tubing is drawn from the die by a pair of nip rolls which also serve to collapse the inflated tube into the form of a ribbon adapted to be wound upon a reel. The tubing is inflated and stretched by means of air or other gaseous medium introduced into the tubing from an air passageway centrally located within the annular die orifice, the inflating medium thus being confined within the tubing between the die and the nip rolls in the form of an isolated gaseous bubble which remains substantially constant in quantity and advances bodily through the successive portions of the tubing.

In the manufacture of tubing by the method and apparatus thus described, it will be noted that the diameter, wall thickness, tensile strength and tear resistance of the finished product is dependent upon the amount of internal expansion, the diameter of the die, and the provision of means to quickly set the molecular structure of the film at a predetermined point in the orientation of the film. By quickly setting the molecular structure of the film, it is possible to provide a more uniform product having higher tensile strength and tear resistance.

This invention further contemplates the provision of an extrusion apparatus in which the breaker plate and screen pack is disposed adjacent the die in order to obtain a film which is free of longitudinal weakness. In other types of extrusion apparatus, it has been common practice to dispose the breaker plate and screen pack adjacent the end of the feed screw. In the present apparatus a closed chamber is provided away from the feed screw to permit the material to relieve itself of its ribbon-like form as it emerges from the end of the screw. By providing this closed chamber between the breaker plate and screen pack and the circular opening of the die, it has been found that a more homogeneous mass is forced through the circular opening of the die and that the resultant film is free of longitudinal weakness.

This invention further contemplates the provision of an extrusion apparatus embodying a pair of discs journaled in spaced opposing relation below the nip rolls to form creases or gussets in opposite sides of the tubing.

This invention further contemplates the provision of an extrusion apparatus in which the nip rolls are preferably arranged in a vertical plane above the die in order to form a more uniform tubing, the nip rolls being adjustably positioned up and down relative to the die to control the dimensions of the finished product.

This invention embodies other novel features, details of construction and arrangement of parts which are hereinafter set forth in the specification and claims, and illustrated in the accompanying drawings, wherein:

Fig. 3 is a front elevational view of the extrusion apparatus.

Fig. 4 is an enlarged longitudinal sectional view taken along the line 4—4 of Fig. 2.

Fig. 5 is a sectional view taken along the line 5—5 of Fig. 4.

Fig. 6 is a sectional view taken along the line 6—6 of Fig. 4.

Fig. 7 is a fragmentary sectional view taken along the line 7—7 of Fig. 4.

Fig. 8 is a sectional view taken along the line 8—8 of Fig. 3.

Fig. 10 is a plan view of same.

Fig. 11 is a detail sectional view taken along the line 11—11 of Fig. 10.

Figure 1:
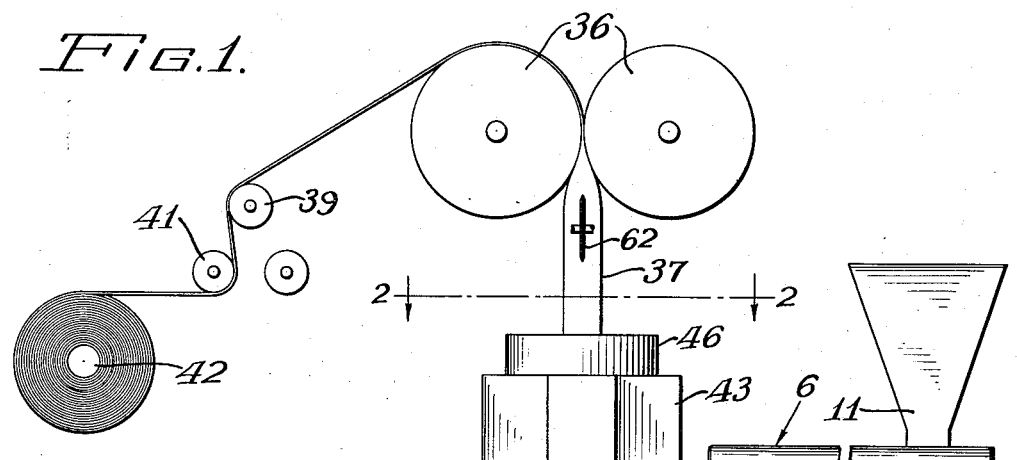
Fig. 1 is a side elevational view illustrating an extrusion apparatus embodying features of the present invention.
Figure 2:
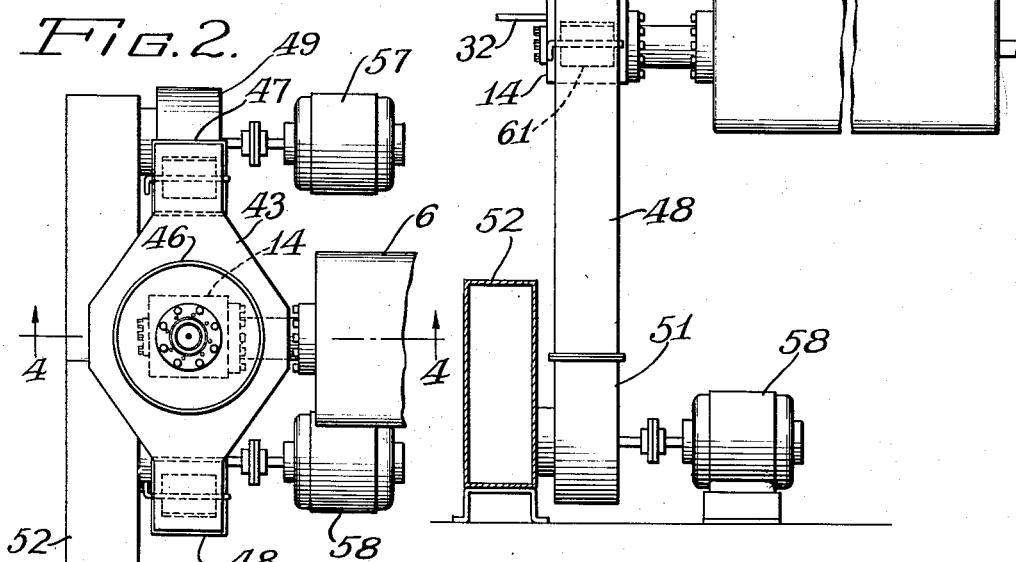
Fig. 2 is a top plan view of same taken along the line 2—2 of Fig. 1.
Figure 9:
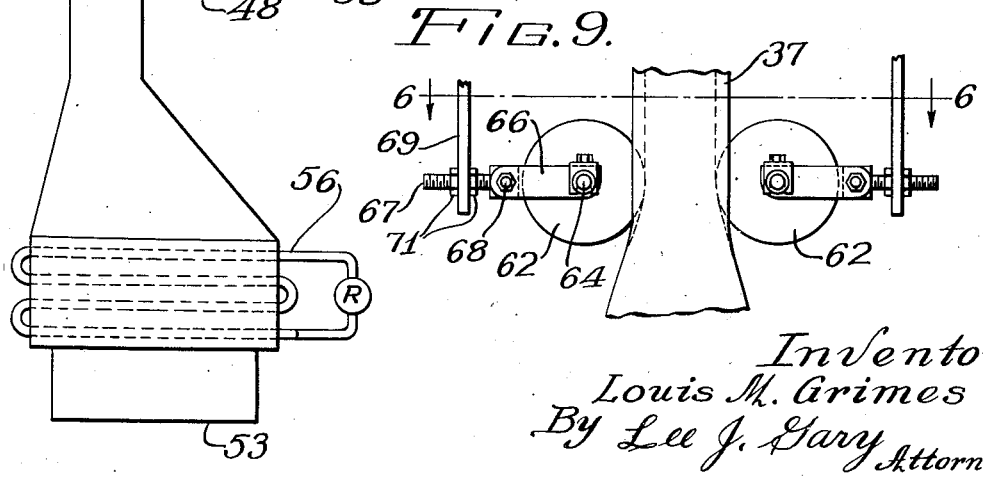
Fig. 9 is a fragmentary side elevational view illustrating the discs employed for forming the gussets in the tubular material.

Referring now to the drawings for a better understanding of this invention, the apparatus for forming thermoplastic tubing is shown as comprising a conventional extrusion machine 6 comprising a cylinder 7 formed with a longitudinally extending bore 8 to receive a feed screw 9. Thermoplastic material in the form of strips, briquettes, powder or granules is fed into the longitudinal bore 8 of the extrusion machine through a hopper feed 11. The feed screw 9 is rotated by means of an electric motor (not shown) to cause the thermoplastic stock to pass in a forward direction through the longitudinal bore 8 and into and through an adapter 12. The cylinder 7 is formed with one or more passageways 13 for the passage of hot oil which serves to heat the cylinder to a temperature of from 350° F. to 500° F. If desired, the cylinder may be heated by electrical heating elements. As the plastic stock moves in a forward direction through the cylinder, it is heated and subjected to a kneading and folding action to provide a homogeneous mass of uniform heat and consistency.

A die 14 is mounted on the outer end of the adapter 12 and comprises a body 16 formed with an internal bore 17 to receive an outer plug 18. A breaker plate 19 formed with apertures 21 extending therethrough is mounted within the inner end of the bore 17. A plurality of wire mesh screens 22 are provided on the inner face of the breaker plate 19.

A collar 23 is secured to the upper end of the die body 16 by means of cap screws 24 and is provided with screws 25 to engage against the ends of pins 27 mounted for axial movement through the flange portion of a sleeve 28 which is loosely fitted within the bore 17 of the body 16. An inner mandrel 29 extends inwardly through the sleeve 28 and the outer plug 18 for threaded engagement at 30 in the breaker plate 19. Suitable adjustment screws 31 are threaded through the die body 16 to engage and adjust the position of the sleeve 28 relative to the inner mandrel 29. A pipe 32, leading from a suitable source of compressed air or other gaseous medium, is threaded into the breaker plate 19 to communicate with passageway 33 which leads to a passageway 34 formed in the inner mandrel 29.

A pair of nip rolls 36—36 are journaled in suitable bearings (not shown) above the die 14 to draw and flatten the thermoplastic tubing 37 passing upwardly from the annular orifice 38 defined by the sleeve 28 and inner mandrel 29. After the thermoplastic tubing 37 has been flattened, it passes around suitable idler rolls 39 and 41 and then onto a reel 42.

A housing 43 is mounted upon the upper end of the die 14 to enclose the thermoplastic tubing 17 as it passes upwardly from the die 14 to the nip rolls 36. The housing 43 is preferably formed from sheet metal and provided with an inturned flange 44 defining an annular aperture to receive a cylindrical sleeve 46. A pair of air conduits 47 and 48 lead downwardly from diametrically opposed sides of the housing 43 to the outlet ends of blowers or centrifugal fans 49 and 51, respectively. The inlet ends of the fans 49 and 51 are connected to a manifold 52 having an air inlet end 53 provided with a filter screen 54. The cooling coils 56 of a refrigerating unit R extend through the interior of the manifold 52 to cool the air to a predetermined temperature. The fans 49 and 51 are driven by suitable electric motors 57 and 58, respectively. If desired, butterfly valves 59 and 61 may be interposed in the conduits 47 and 48, respectively, to control the volume of air passing therethrough.

A pair of gusset-forming discs 62—62 are adapted to be positioned against opposite sides of the thermoplastic tubing 37 to form recesses or gussets 63 in opposite sides of the tubing. Each disc 62 is secured to a shaft 64 journaled at the free ends of arms 66—66. The inner ends of the arms 66—66 are secured to opposite sides of a T-head bolt 67 by means of a bolt 68. The T-head bolt 67 is adjustably positioned upon a suitable bracket 69 by means of adjustment nuts 71. As illustrated more clearly in Fig. 11, the shaft 64 may be adjusted axially by means of an adjustment arm 72 having its one end bifurcated at 73 to engage between a pair of collars 74—74. The other end of the arm 72 is slotted to receive a locking screw 76 which is threaded into an arm 66.

In forming continuous seamless tubing by the apparatus thus shown and described, the thermoplastic material in a molten condition is extruded through the longitudinal bore 8 of the extrusion machine 6 by means of the feed screw 9. The thermoplastic material passes through the adapter 12 and into a chamber 77 formed in the die body 16 below the screen pack 22 and breaker plate 19. The thermoplastic material is forced upwardly from the chamber 77 through the screen pack 22 and apertures 21 formed in the breaker plate 19 and thence upwardly through the annular orifice 38 defined by the outer plug member 18, sleeve 28 and inner mandrel 29. As the thermoplastic material passes upwardly from the annular orifice 38, it is in an unset or partly set condition and capable of being inflated and stretched to cause the tubing to assume a larger diameter. The tubing passes vertically from the die 14 to the nip rolls 36—36 which act to flatten the tubing 37 and also act to draw the tubing upwardly from the die. The flattened tubing is directed from the nip rolls 36—36 to the idler rolls 39 and 41 and thence onto a reel 42.

As the unset or partly set thermoplastic tubing is drawn upwardly through the annular orifice 38 by the nip rolls 36—36, it is expanded to a larger diameter by the introduction of air or other gaseous medium passing through the pipe 32 and passageways 33 and 34 into the interior of the tubing 37. The gaseous medium within the tubing 37 is in the form of a bubble between the die 14 and the nip rolls 36—36 and remains substantially constant in quantity. After the tubing 37 has been expanded by the gaseous medium to a predetermined diameter, as illustrated in Figs. 1 and 4, it is set immediately by the passage of refrigerated air through the housing 43. The air for setting the thermoplastic tubing 37 enters the manifold 52 at 53 and is cooled to a predetermined temperature by the cooling coils 56 of a refrigerating unit R. The centrifugal fans 49 and 51 force the refrigerated air from the manifold 52 into the conduits 47 and 48, respectively, and thence into the housing 43. The refrigerated air within the housing 43 encloses and sets the thermoplastic tubing 37 as the air moves upwardly from the housing through the cylindrical sleeve 46. The sleeve 46 is adjustable vertically relative to the housing 43 by means of adjustment screws 78. A baffle ring 79 is provided in the bottom of the housing 43 to deflect the refrigerated air inwardly and upwardly toward the tubing 37. To insure a uniform product having the desired tensile strength longitudinally and transversely, it is essential to quickly set the molecular structure of the film at a predetermined point in the orientation of the film so as to preserve in the film a further elastic limit. In other types of apparatus for producing seamless thermoplastic tubing, the film is often oriented or stretched to a size which produces a film having minimum tensile strength and tear resistance, due to the fact that the molecules in the film are not quickly chilled and set when the tubing has reached a predetermined diameter.

In other forms of apparatus for making seamless thermoplastic tubing, it has been the practice to dispose the screen pack and breaker plate adjacent the end of the feed screw in the extrusion machine. In the present invention it has been found that better results are obtained by disposing the screen pack 22 and breaker plate 19 within the die 14 and as close as possible to the annular orifice 38. The molten thermoplastic material, in the present invention, is directed from the extrusion machine 6 into a closed chamber 77 within the die 14 to permit the material to relax and relieve itself from its ribbon-like form set up by the feed screw 9. A more homogeneous thermoplastic mass is thus formed within the closed chamber 77 for passage upwardly through the screen pack 22 and breaker plate 19 into the annular orifice 38. To produce a more uniform product, it has also been found desirable to provide electrical resistance units 79 within the die 14 to control the temperature of the molten thermoplastic material as it passes through the annular orifice 38.

When it is desired to produce gusseted seamless tubing, the discs 62—62 are moved into engagement against opposite sides of the tubing 37 immediately below the entrance to the nip rolls 36—36. The discs 62—62 are mounted upon shafts which are preferably journaled in antifriction bearings to prevent scoring of the film or rearrangement of the molecules therein. The discs 62—62 form creases or gussets 63—63 of desired depth in opposite sides of the tubing 37 by merely adjusting the position of the discs toward or away from each other.

While this invention has been shown in but one form, it is obvious to those skilled in the art that it is not so limited but is susceptible of various changes and modifications without departing from the spirit and scope of the claimed invention.

I claim as my invention:

1. In an apparatus for making seamless flattened tubing, comprising a heating device for reducing thermoplastic material to a molten plastic state including a feed screw for kneading said material and delivering it forwardly, a relatively elongated closed compartment of substantially constant cross-sectional area throughout its length into which said screw feeds the material wherein said material is rendered more homogeneous, means at the opposite end of said compartment from the feed screw to continuously extrude the molten thermoplastic mass delivered from said compartment, said extruded mass moving in a vertical upward direction in the form of a seamless tubing, a pair of nip rolls disposed above the extruding means to engage, draw and flatten the tubing, means for introducing a gaseous medium under pressure into the interior of the tubing between the extruding means and the nip rolls to inflate the tubing to a predetermined diameter, and a housing disposed in spaced relationship to the path of travel of the tubing between the extruding means and the nip rolls to form a cooling chamber for said tubing.

2. In an apparatus for making seamless flattened tubing, means to continuously extrude a molten thermoplastic mass in a vertical upward direction in the form of a seamless tubing, a pair of nip rolls disposed above said extruding means to engage, draw and flatten the tubing, means to introduce a gaseous medium into the interior of the tubing between its point of extrusion and said nip rolls to inflate the tubing to a predetermined diameter, a housing having a relatively large diameter disposed in spaced relation with respect to the path of travel by the tubing between the extruding means and said nip rolls to form a cooling chamber for said tubing, and a tubular member of relatively restricted diameter telescopically mounted on the upper end of said housing and extending upwardly from said housing in circumscribing relationship to the path of travel of said tubing intermediate the extruding means and nip rolls.

3. In an apparatus for making seamless flattened tubing, means for continuously extruding a molten thermoplastic mass in a vertical upward direction in the form of a seamless tubing, a pair of nip rolls disposed above the extruding means to engage, draw and flatten the tubing, means for introducing a gaseous medium into the interior of the tubing between the extruding means and said nip rolls to inflate the tubing to a predetermined diameter, a housing having a relatively large diameter disposed in spaced relation around the path of travel of the tubing between the extruding means and said nip rolls to form a cooling chamber for said tubing and a tubular member of relatively smaller diameter than said housing mounted upon said housing in coaxial relationship thereto and in circumscribing relationship to the path of travel of the tubing, said tubular member extending upwardly from the housing, and means for adjustably positioning said tubular member vertically to change the circumscribed length of the tubular member and the housing with respect to the path of travel of the tubing.

4. The method of making a thermoplastic tubing of predetermined physical characteristics, which comprises continuously extruding a tubing in which the thermoplastic film is in an unset condition, carrying said tubing forwardly inflating the tubing adjacent its point of extrusion as it is carried forwardly, and then chilling the inflated tubing as it is carried forwardly with a blast of refrigerated relatively dry air to quickly set the tubing at a predetermined diameter and at a predetermined point in the orientation of the film, and varying the length of time in which the tubing is subjected to the refrigerated air in proportion to the speed of forward movement of said tubing.

5. In an apparatus for making seamless tubing comprising a heating device for rendering molten a thermoplastic material, a chamber of relatively large diameter for carrying said material a feed screw positioned in said chamber for kneading said molten material and feeding it forwardly, a relatively elongated compartment having a relatively restricted diameter which is constant throughout its length into which said molten material is moved under pressure by said screw, a body, said body having a passageway extending therethrough, said passageway at one end being in communication with said chamber at the end thereof remote from the feed screw, means mounted within one end of said passageway to define an annular orifice for extrusion of the molten material delivered from said chamber, a breaker plate mounted within said passageway adjacent its connection to said chamber, and a screen pack disposed within said passageway adjacent the breaker plate, said mass being adapted to pass through said breaker plate and screen pack in its travel to said orifice.

LOUIS M. GRIMES.

REFERENCES CITED

The following references are of record in the file of this patent:

UNITED STATES PATENTS

| Number | Name | Date |
|---|---|---|
| 1,361,346 | Nichols | Dec. 7, 1920 |
| 1,618,026 | Royle | Feb. 15, 1927 |
| 1,768,671 | Devine | July 1, 1930 |
| 2,291,212 | Clinefelter | July 28, 1942 |
| 2,461,975 | Fuller | Feb. 15, 1949 |
| 2,461,976 | Schenk | Feb. 15, 1949 |
| 2,499,398 | Lyon | Mar. 7, 1950 |